United States Patent
Bohli et al.

(10) Patent No.: US 9,419,994 B2
(45) Date of Patent: Aug. 16, 2016

(54) METHOD FOR IDENTIFYING POTENTIALLY MALICIOUS NETWORK ELEMENTS WITHIN A NETWORK USING CROSS-DOMAIN COLLABORATIVE DATA SHARING

(75) Inventors: Jens-Matthias Bohli, Leimen (DE); Giuseppe Bianchi, Rome (IT)

(73) Assignee: NEC CORPORATION, Tokyo (JP)

(*) Notice: Subject to any disclaimer, the term of this patent is extended or adjusted under 35 U.S.C. 154(b) by 0 days.

(21) Appl. No.: 14/402,722

(22) PCT Filed: May 25, 2012

(86) PCT No.: PCT/EP2012/059878
§ 371 (c)(1),
(2), (4) Date: Nov. 21, 2014

(87) PCT Pub. No.: WO2013/174447
PCT Pub. Date: Nov. 28, 2013

(65) Prior Publication Data
US 2015/0134961 A1    May 14, 2015

(51) Int. Cl.
*G06F 9/00* (2006.01)
*H04L 29/06* (2006.01)
(Continued)

(52) U.S. Cl.
CPC ............ *H04L 63/1441* (2013.01); *H04L 9/085* (2013.01); *H04L 9/3013* (2013.01); *H04L 9/3066* (2013.01); *H04L 63/0209* (2013.01); *H04L 63/0227* (2013.01); *H04L 63/061* (2013.01); *H04L 63/065* (2013.01);
(Continued)

(58) Field of Classification Search
CPC . H04L 63/1441; H04L 63/061; H04L 63/065; H04L 63/0209; H04L 9/085; H04L 9/3013; H04L 9/3066; H04L 63/0227; H04L 63/1408; H04L 63/1458; H04L 63/0428
See application file for complete search history.

(56) References Cited

U.S. PATENT DOCUMENTS 6,834,112 B1 * 12/2004 Brickell .................. G06F 21/31
380/279
8,214,490 B1 * 7/2012 Vos ..................... H04L 63/0227
709/206

(Continued)

OTHER PUBLICATIONS

Chenfeng Vincent Zhou et al: "Evaluation of a Decentralized Architecture for Large Scale Collaborative Intrusion Detection", Integrated Network Management, IM '07. 10$^{th}$ IFIP/IEEE International Symposium, May 1, 2007, pp. 80-89, XP031182681.

(Continued)

*Primary Examiner* — Morshed Mehedi
*Assistant Examiner* — Sharon Lynch
(74) *Attorney, Agent, or Firm* — Leydig, Voit & Mayer, Ltd.

(57) ABSTRACT

A method for identifying potentially malicious network elements within a network is useable in a network which includes a plurality of domains administrated by different operators P1, . . . , Pn. In the method, a functional entity receives qualifying information regarding at least one network element that has been transmitted by at least some of the operators P1, . . . , Pn. The at least one network element is qualified as being potentially malicious. The functional entity provides at least one of an alarm information and an alarm activity based on a predefined number of the operators P1, . . . , Pn having transmitted the qualifying information regarding a same potentially malicious network element to the functional entity.

12 Claims, 1 Drawing Sheet

(51) Int. Cl.
*H04L 9/08* (2006.01)
*H04L 9/30* (2006.01)

(52) U.S. Cl.
CPC ........ *H04L63/1408* (2013.01); *H04L 63/1458* (2013.01); *H04L 63/0428* (2013.01); *H04L 2463/144* (2013.01)

(56) References Cited

U.S. PATENT DOCUMENTS

| | | | | |
|---|---|---|---|---|
| 8,260,914 | B1* | 9/2012 | Ranjan | H04L 61/1511 709/224 |
| 8,443,439 | B2* | 5/2013 | Lamastra | H04L 12/585 713/188 |
| 8,443,446 | B2* | 5/2013 | Lamastra | H04L 12/585 713/188 |
| 8,661,544 | B2* | 2/2014 | Yen | H04L 29/12066 726/24 |
| 8,677,479 | B2* | 3/2014 | Neystadt | G06F 21/552 726/22 |
| 8,813,228 | B2* | 8/2014 | Magee | G06F 21/577 713/187 |
| 8,904,181 | B1* | 12/2014 | Felsher | H04L 9/0825 380/282 |
| 8,904,524 | B1* | 12/2014 | Hodgman | G06F 21/56 726/22 |
| 2007/0169194 | A1* | 7/2007 | Church | G06F 21/552 726/23 |
| 2007/0209075 | A1* | 9/2007 | Coffman | H04L 63/14 726/23 |
| 2008/0256619 | A1* | 10/2008 | Neystadt | G06F 21/552 726/11 |
| 2009/0144823 | A1* | 6/2009 | Lamastra | H04L 12/585 726/22 |
| 2011/0153811 | A1* | 6/2011 | Jeong | H04L 63/14 709/224 |
| 2011/0255687 | A1* | 10/2011 | Farrugia | H04L 9/3013 380/28 |
| 2011/0271344 | A1* | 11/2011 | Unagami | G06F 21/554 726/23 |
| 2012/0054869 | A1* | 3/2012 | Yen | H04L 29/12066 726/24 |
| 2012/0084860 | A1* | 4/2012 | Cao | H04L 63/1441 726/23 |
| 2012/0151585 | A1* | 6/2012 | Lamastra | H04L 12/585 726/24 |
| 2013/0305377 | A1* | 11/2013 | Herz | G06Q 20/201 726/25 |
| 2014/0059345 | A1* | 2/2014 | Camenisch | H04L 9/3073 713/165 |

OTHER PUBLICATIONS

Locasto M E et al: "Towards collaborative security and P2P intrusion detection". Systems, Man and Cybernetics (SMC) Information Assurance Workshop, Proceedings From the Sixth Annual IEEE, Jun. 15, 2005. pp. 333-339; XP010826354.

Guiseppe Bianchi et al: "Enabling conditional cross-domain data sharing via a cryptographic approach", Internet Multimedia Systems Architecture and Application (IMSA), 2011 IEEE 5th International Conference on ; IEEE, Dec. 12, 2011, pp. 1-6, XP032123569.

* cited by examiner

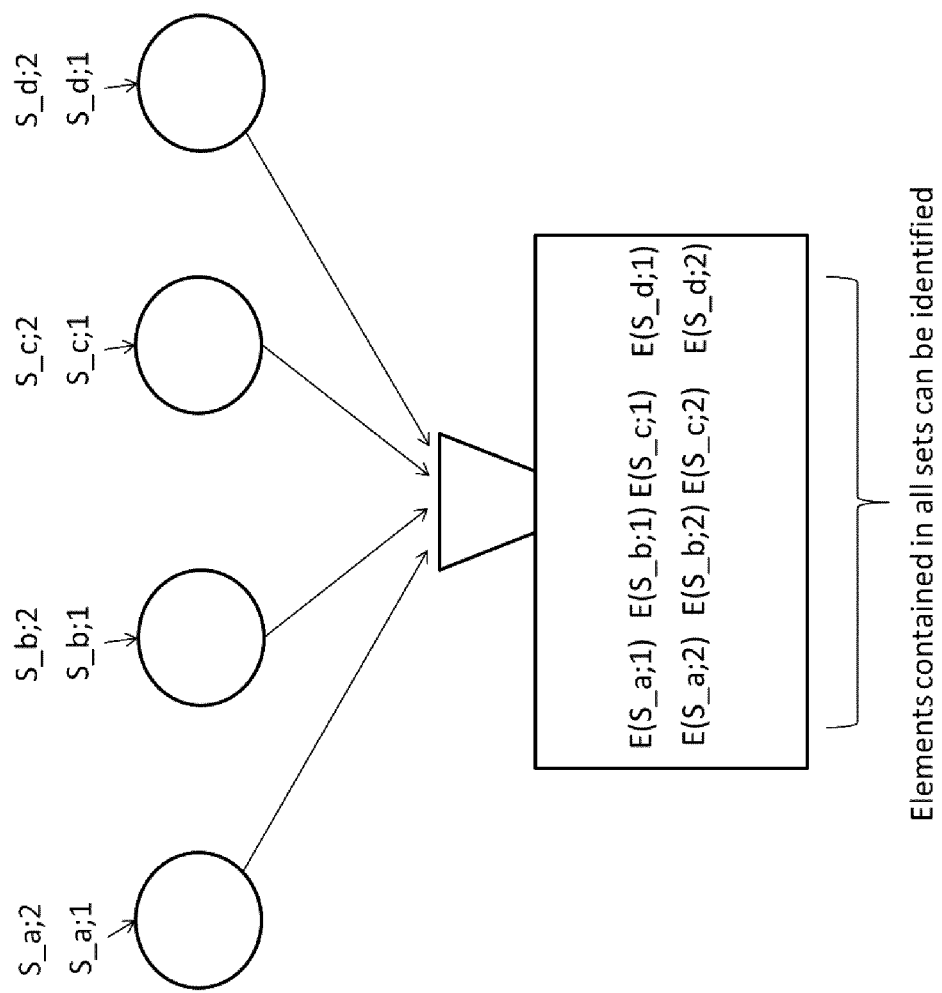

METHOD FOR IDENTIFYING POTENTIALLY MALICIOUS NETWORK ELEMENTS WITHIN A NETWORK USING CROSS-DOMAIN COLLABORATIVE DATA SHARING

CROSS-REFERENCE TO PRIOR APPLICATIONS

This application is a U.S. National Stage Application under 35 U.S.C. §371 of International Application No. PCT/EP2012/059878 filed on May 25, 2012. The International Application was published in English on Nov. 28, 2013 as WO 2013/174447 A1 under PCT Article 21(2).

FIELD

The present invention relates to a method for identifying potentially malicious network elements within a network, wherein the network comprises multiple domains administrated by different operators P1, ..., Pn. Further, the present invention relates to a network, wherein the network comprises multiple domains administrated by different operators P1, ..., Pn.

BACKGROUND

In today's Internet, which is an example for a network with many network elements, many cross-domain threats exist. One important cause is the emergence of large-scale coordinated attach infrastructures, such as Botnets, which infect hosts across multiple administrative domains and make attacks by botnets difficult to detect. Detection of attacks could be significantly eased and made faster, by harvesting and correlating network security information from multiple domains' observation points. For instance, noting that a same IP (Internet Protocol) address exhibits anomalous access patterns consistently coming from several domains may foster confidence in concluding that something is wrong with such an address. However, sharing information across heterogeneous administrative domains comes along with severe concerns, such as the network users' privacy, the operators' secrecy needs, and regulation.

A privacy friendly solution can be given if the following problem is solved:

- The domain operators monitor their network domain locally, marking certain nodes, e.g. represented by their IP address, as potentially being malicious.
- The domain operators cannot share the list of potentially malicious nodes with other operators, e.g. due to privacy requirements, regulation, business interests.
- If a node is marked as being potentially malicious by all operators, alternatively by a number of operators or above a threshold, then there is enough evidence that the respective node is malicious and the fact that this IP address is considered malicious by all operators should be learnt by all operators.

Current state-of-the-art provides two solutions:

A first solution addressing the problem above is described in G. Bianchi, H. Rajabi, M. Sgorlon; Enabling Conditional Cross-domain Data Sharing via a Cryptographic Approach; IEEE workshop on collaborative security technologies, 12-13 Dec. 2011, Bangalore, India. However that solution does not offer perfect privacy: it allows linking of information even if the node does not appear at all nodes.

The problem described above can be solved by state-of-the-art cryptographic techniques because it is a variant of "private set intersection" protocols, see Lea Kissner, Dawn Xiaodong Song: Privacy-Preserving Set Operations. CRYPTO 2005: 241-257. However, all state-of-the-art protocols need communication rounds between the domain operators.

SUMMARY

In an embodiment, the present invention provides a method for identifying potentially malicious network elements within a network that is useable in a network which includes a plurality of domains administrated by different operators P1, ..., Pn. In the method, a functional entity receives qualifying information regarding at least one network element that has been transmitted by at least some of the operators P1, ..., Pn. The at least one network element is qualified as being potentially malicious. The functional entity provides at least one of an alarm information or an alarm activity based on a predefined number of the operators P1, ..., Pn having transmitted the qualifying information regarding a same potentially malicious network element to the functional entity.

BRIEF DESCRIPTION OF THE DRAWING

The present invention will be described in even greater detail below based on the exemplary FIGURE. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawing which illustrates the following:

FIG. 1 is a diagram showing the principal of the transmission of qualifying information to a functional entity.

DETAILED DESCRIPTION

In an embodiment, the present invention improves and further develops a method for identifying potentially malicious network elements within a network and an according network for allowing a very effective and privacy friendly identification of potentially malicious network elements within a network.

According to one embodiment, a method provides that at least some of said operators P1, ..., Pn transmit qualifying information regarding at least one network element, said at least one network element being qualified as being potentially malicious, to a functional entity. The functional entity provides an alarm information and/or alarm activity, if a predefined number of operators has transmitted such qualifying information regarding the same potentially malicious network element to the functional entity.

According to another embodiment, a network provides that at least some of said operators P1, ..., Pn comprise a device for transmitting qualifying information regarding at least one network element, said at least one network element being qualified as being potentially malicious, to a functional entity. The functional entity comprises a device for providing an alarm information and/or alarm activity, if a predefined number of operators has transmitted such qualifying information regarding the same potentially malicious network element to the functional entity.

According to an embodiment of the invention, it has been recognized that, for sharing information regarding potentially malicious network elements, it is not necessary to provide communication rounds between the domain operators. Further, it has been recognized that the provision of a functional entity for handling such qualifying information improves and further develops the method for identifying potentially malicious network elements within a network in a very simple way. Concretely, at least some of said operators transmit qualifying information regarding at least one network element, said at least one network element being qualified as being potentially malicious, to said functional entity. Further, for providing the operators with relevant information the functional entity provides an alarm information and/or alarm activity, if a predefined number of operators has transmitted such qualifying information regarding the same potentially malicious network element to the functional entity. Such an alarm information and/or alarm activity could be provided to the operators for learning that a specific network element is potentially malicious.

Thus, a very effective and privacy friendly identification of potentially malicious network elements within a network is possible.

Within a preferred embodiment, said at least one network element could be a network element of the operators' individual domain.

Within a preferred embodiment said functional entity could provide an alarm information and/or alarm activity, if all operators P1, ..., Pn have transmitted such qualifying information regarding the same potentially malicious network element to the functional entity. This will provide a very high degree of confidence in concluding that the respective network element is potentially malicious.

Regarding a very simple and effective embodiment of the method, the network elements could be represented by their IP address. No further identification elements are necessary.

Within a further preferred embodiment, the functional entity could be a central entity for all operators or for a predefined number of operators. This will provide a very simple network structure and an effective and privacy friendly method.

With regard to a further preferred embodiment, the functional entity could be a distributed entity, wherein each operator or a predefined number of operators operates its own functional entity receiving the qualifying information from the other operators. In this case, no central functional entity and an according management structure is necessary. The management of the own functional entities could be provided by the respective operator.

Regarding a very effective embodiment of the method, each operator or a predefined number of operators or the respective functional entities could receive the qualifying information from the other operators directly, i.e. without further transmitting elements.

Within a further preferred embodiment, the transmission of the qualifying information from the operators P1, ..., Pn to the functional entity could be provided by a push process. This will result in a very fast processing of the individual qualifying information and possible provision of an alarm information and/or alarm activity by the functional entity. A further result is a high security level within the network.

Alternatively, the transmission of the qualifying information from the operators P1, ..., Pn to the functional entity could be provided by a collecting process initiated by the functional entity. On the basis of such a collecting process, the communication between the operators and the functional entity could be performed at definable points in time for saving network resources during the remaining time.

Preferably, the collecting process could be performed after predefined time intervals for reliably disposing network resources.

For providing a high degree of network security, the alarm information and/or alarm activity could be transmitted or communicated to all operators P1, ..., Pn.

Within a further preferred embodiment, the operators could transmit qualifying information regarding sets of potentially malicious network elements and the functional entity could compute a set intersection of the transmitted sets and could identify any network element that appears in all sets or in a predefined number of sets. Depending on the individual situation an individual composition of such sets is possible.

For providing a very high degree of privacy, the qualifying information or the network elements could be encrypted by the operators P1, ..., Pn. In this regard, private keys could be generated and/or distributed to the operators, preferably in a bootstrapping phase.

Within a preferred embodiment, the encryption could be performed by mapping the network element into a cyclic group with a hard dlog (discrete logarithm) problem and computing an exponentiation with the private key. However, other encryption techniques are possible.

As a preferred evaluation function, multiplication could be used in the cyclic group.

For improving the scalability of the system, partial information about the network elements could be made public, so that several smaller instances could be executed in parallel with only those elements that match in the revealed information.

Further preferred embodiments of the invention could include one or more of the following features:
1) Using a system that collects encrypted warning messages from the parties and outputs an alarm message if all parties warn about the same element.
2) Using a private set intersection protocol, that does not require interactive communication between the parties for generating the alarm out of the warning messages.
3) Using a cyclic group with a hard dlog problem, and distribute secret keys to the parties that sum up to a previously fixed number modulo the size of the group.
4) Encrypting the warning by mapping the element into the cyclic group and raising it to the power of the secret key of that party.
5) Identifying if an alarm has to be given, by taking tuples of encrypted elements, one from each party, and evaluating the encrypted elements.
6) Using multiplication in the cyclic group as evaluation function.

In accordance with embodiments of the invention, strong privacy guarantees are given. No information is revealed if an element is not in the intersection. No interactive communication is needed to evaluate the set intersection.

Also in accordance with embodiments of the invention, no information is disclosed to other parties unless the elements match. In contrast, in the state of the art solution, the information is at least linkable.

A preferred embodiment of the invention will be explained on the basis of the following scenario. The scenario assumes
n parties, representing the domain operators, denoted by P1, ..., Pn.
Each party holds a set of elements. The set of P_i is denoted by S_i holding the elements s_1, ..., s_n. In the main scenario of network monitoring, the elements are IP-addresses.

An embodiment of the invention provides a method with a functional entity or device, named 'bulletin board' which collects input from the parties and raises an alarm if one element appears in the sets of all parties. The bulletin board can be a central device, but also be distributed, i.e. every party operates its own device and receives messages from the other parties directly.

The communication is done by push messages. If a party adds a new element to their set, a message is sent to the bulletin board or to the other parties if the system is distributed. This qualifying information is called an 'encrypted element' and the encrypted element that is associated with element s_i is denoted by t_i.

The bulletin board uses the method described below to compute the set intersection of the inputs, i.e. identify any element that appears in the encrypted lists of all parties.

FIG. 1 shows in a diagram the transmission of the elements to the functional entity or bulletin board. The parties are shown in circles and have elements which they encrypt and send to the central bulletin board. This central functional entity is able to identify the elements that are contained in all sets.

On a high level, the system works as follows: The domain operators encrypt their elements and communicate them to the bulletin board. The domain operators can easily add elements later on, by providing the encryption of elements to be added to the bulletin board. The encryption guarantees that no information—except the number of elements—about the parties' input is disclosed. By combining a set of elements, one from each party, a computation can reveal if they are encryptions of the same element. If they are not encryptions of the same element, no knowledge is gained.

Concretely, a preferred embodiment consists of:
a method to generate and distribute private keys to the parties in the bootstrapping phase
a method for the parties to encrypt their elements
the bulletin boards and communication channels between the parties and a bulletin board
a method that extracts the elements that are contained in the set intersection of all participating parties.

Obtaining Private Keys:

Parties obtain keys that have a sum of 1 modulo the size of the group G that is used for encryption. This can be done by a trusted third party that creates and distributes the keys, or by a secure distributed computation among the parties.

Alternatively, the sum of the keys could be chosen to be 0 mod the group size. Then the system only detects that certain encrypted elements match but does not decode the element. If the parties know the relation between elements and encrypted elements, they can identify the corresponding element locally.

Alternatively, the sum of the keys might be any other constant >1, which leads to an equivalent scheme when the offset is corrected during the computation.

Encrypting Elements:

The encryption is done by mapping the node into a cyclic group G with a hard dlog problem and computing an exponentiation with the key, i.e.

A cyclic group G.

$E_{key}(S) = \text{map}(S)^{key}$, where map() is a injective function that maps an element, e.g. and IP address, into the group G.
  The group should have a size large enough so that a random group element is only with a very small probability the result of map(element) with a valid element, e.g. an IP address. This probability determines the probability of false alarms.
  The map function might be invertible which is beneficial in case the element should be decrypted.

Extracting Elements:

The analysis is done by taking any combination of encrypted elements, one from each party, and checking if the multiplication of the encrypted decodes to a plaintext element.

$$E_{key1}(S) * E_{key2}(S) * \ldots * E_{keyn}(S) = \text{map}(S)^{key1+key2+\ldots+keyn} = \text{map}(S)^1$$

Improving the Scalability:

To improve the scalability of the system, partial information about the elements can be made public, so that several smaller instances can be executed in parallel with only those elements that match in the revealed information. If Y instances are used in parallel, this decreases the number of elements in each instance approximately by a factor Y, which can be the speed-up necessary to make the system practical.

As an example, for the case of IP-Addresses, instead of setting up one system, $2^X$ systems are set up in parallel, where X is the amount of information about the IP-Addresses that the parties are willing to leak even if no alarm is generated. The party that issues a warning about an IP-Address proceeds as before, but in addition reveals X bits on previously agreed positions. Ideally, discontiguous bits in the middle of the address are used as those tend to be least identifying. The party choses the system that belongs to the specific bits revealed, so that it needs only to be matched to the elements that are in the same category.

Many modifications and other embodiments of the invention set forth herein will come to mind the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for identifying potentially malicious network elements within a network, wherein the network comprises a plurality of domains administrated by different operators, the method comprising:

receiving, by a network device of the network, information, encrypted by private keys using a cyclic group, from the different operators qualifying sets of one or more network elements as being potentially malicious, wherein the private keys are distributed to the different operators for encryption of the information, and wherein each of the different operators, or a subset of the different operators, operates a separate network device and receives information from other operators;

computing, by the network device, based on the information received from the different operators, a set intersection between the sets of one or more network elements qualified as potentially malicious by the different operators and identifying a network element that appears in all the sets of one or more network elements qualified as potentially malicious by the different operators or in at least a predefined number of the sets of one or more network elements qualified as potentially malicious by the different operators; and providing, by the network device, in response to the computing, a notification to the different operators indicating that the identified network element is potentially malicious.

2. The method according to claim 1, wherein the identified network element appears in all the sets of one or more network elements qualified as potentially malicious.

3. The method according to claim 1, wherein the identified network element is represented by an Internet Protocol (IP) address.

4. The method according to claim 1, wherein the network device is a central network device for all of the different operators or for a subset of the different operators.

5. The method according to claim 1, wherein transmission of the information from the different operators to the network device is provided by a push process.

6. The method according to claim 1, wherein transmission of the information from the different operators to the network device is provided by a collecting process initiated by the network device.

7. The method according to claim 6, wherein the collecting process is performed according to a predefined time interval.

8. The method according to claim 1, wherein the at least one of the alarm information and the alarm activity is transmitted or communicated to all of the operators $P1, \ldots, Pn$.

9. The method according to claim 1, wherein the information is encrypted by mapping the cyclic group with a hard discrete logarithm (d log) problem and computing an exponentiation with a private key.

10. The method according to claim 9, wherein multiplication is used in the cyclic group as an evaluation function.

11. The method according to claim 1, further comprising publicizing partial information about the at least one network element.

12. A system for identifying potentially malicious network elements within a network, wherein the network comprises a plurality of domains administrated by different operators, the system comprising:

one or more network devices, each network device comprising a processor and a non-transitory computer-readable medium having processor-executable instructions stored thereon;

wherein execution of the processor-executable instructions of the one or more network devices facilitates:

receiving, by the one or more network devices, information, encrypted by private keys using a cyclic group, from the different operators qualifying sets of one or more network elements as being potentially malicious, wherein the private keys are distributed to the different operators for encryption of the information, and wherein each of the different operators, or a subset of the different operators, operates a separate network device and receives information from other operators;

computing, by the one or more network devices, based on the information received from the different operators, a set intersection between the sets of one or more network elements qualified as potentially malicious by the different operators and identifying a network element that appears in all the sets of one or more network elements qualified as potentially malicious by the different operators or in a predefined number of the sets of one or more network elements qualified as potentially malicious by the different operators; and providing, by the one or more network devices, in response to the computing, a notification to the different operators indicating that the identified network element is potentially malicious.

* * * * *